United States Patent
Hsu et al.

(10) Patent No.: US 11,262,793 B2
(45) Date of Patent: Mar. 1, 2022

(54) FOLDING-TYPE ELECTRONIC DEVICE

(71) Applicants: Chia-Hao Hsu, Taipei (TW); You-Yu Chen, Taipei (TW); Chia-Huang Chan, Taipei (TW); Wei-Feng Hsieh, Taipei (TW); Kai-Cheng Chao, Taipei (TW)

(72) Inventors: Chia-Hao Hsu, Taipei (TW); You-Yu Chen, Taipei (TW); Chia-Huang Chan, Taipei (TW); Wei-Feng Hsieh, Taipei (TW); Kai-Cheng Chao, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 17/029,007

(22) Filed: Sep. 22, 2020

(65) Prior Publication Data

US 2021/0325927 A1 Oct. 21, 2021

Related U.S. Application Data

(60) Provisional application No. 63/012,286, filed on Apr. 20, 2020.

(51) Int. Cl.
*G06F 1/16* (2006.01)
(52) U.S. Cl.
CPC .......... *G06F 1/1616* (2013.01); *G06F 1/1652* (2013.01); *G06F 1/1681* (2013.01)

(58) Field of Classification Search
CPC ..... G06F 1/1616; G06F 1/1652; G06F 1/1681
See application file for complete search history.

(56) References Cited

U.S. PATENT DOCUMENTS

| | | | | |
|---|---|---|---|---|
| 5,731,829 A | * | 3/1998 | Saito | G06F 1/1637 347/104 |
| 6,091,600 A | * | 7/2000 | Jeong | G06F 1/1667 361/679.12 |
| 9,507,388 B1 | * | 11/2016 | Hampton | G06F 1/1618 |
| 2020/0117245 A1 | * | 4/2020 | Ou | G06F 1/1681 |
| 2020/0267856 A1 | * | 8/2020 | Hsu | H05K 5/0017 |
| 2020/0355216 A1 | * | 11/2020 | Bae | G06F 1/1681 |
| 2020/0409427 A1 | * | 12/2020 | Hsu | G06F 1/1681 |
| 2020/0409428 A1 | * | 12/2020 | Wang | G06F 1/1641 |
| 2020/0409429 A1 | * | 12/2020 | Hsu | E05D 11/06 |

* cited by examiner

*Primary Examiner* — Anthony Q Edwards
(74) *Attorney, Agent, or Firm* — JCIPRNET

(57) ABSTRACT

A folding-type electronic device including a first housing, a second housing, at least one hinge structure, an elastic cover, two bearing plates, a flexible screen, first synchronous gears, and second synchronous gears is provided. The first housing and the second housing are symmetrical to a centerline. The hinge structure is respectively connected to the first housing and the second housing, and the centerline passes through the hinge structure. The elastic cover is slidably disposed between the hinge structure and the first housing and the second housing and has first racks. The bearing plates have second racks. The flexible screen is disposed on the bearing plates. Each first and second synchronous gear is respectively pivoted to the first and second housings. Each first and second synchronous gear is engaged with each corresponding first and second rack.

13 Claims, 6 Drawing Sheets

FOLDING-TYPE ELECTRONIC DEVICE

CROSS-REFERENCE TO RELATED APPLICATION

This application claims the priority benefit of U.S. provisional application No. 63/012,286, filed on Apr. 20, 2020. The entirety of the above-mentioned patent application is hereby incorporated by reference herein and made a part of this specification.

BACKGROUND OF THE INVENTION

Field of the Invention

The invention relates to an electronic device, and more particularly to a folding-type electronic device.

Description of Related Art

With the development of portable electronic devices such as tablet computers and smart phones, desktop computers and bulky notebook computers that are not portable are gradually losing popularity. In particular, portable electronic devices have the characteristics of light weight and small thickness. However, most of the existing portable electronic devices adopt hard glass screens and do not have a folding function. Therefore, the screen size of the portable electronic devices is limited. If the screen size is too large, the advantage of portability is affected. Therefore, the existing portable electronic devices may not meet the demand for large screens.

For this reason, electronic devices with folding screens have been developed to meet the needs of large-screen display. The existing technique is to lay a flexible screen on two hinged bodies. When the two bodies expand or fold each other, the flexible screen may be expanded or folded correspondingly. However, the two bodies of the prior art do not adjust their positions accordingly during the rotation process, and instead directly squeeze the flexible screen. This causes the flexible screen to withstand excessive external force during the deformation process, and is prone to elastic fatigue or even damage under long-term use.

SUMMARY OF THE INVENTION

The invention provides a folding-type electronic device with two slidable bearing plates. During the folding process, the two bearing plates are adapted to drive a flexible screen to be moved outward, so as to prevent the flexible screen from being squeezed and damaged by an external force.

A folding-type electronic device of the invention includes a first housing, a second housing, at least one hinge structure, an elastic cover, two bearing plates, a flexible screen, a plurality of first synchronous gears, and a plurality of second synchronous gears. The second housing is spaced from the first housing and symmetrical to a centerline. The at least one hinge structure is respectively connected to the first housing and the second housing, and the centerline passes through the at least one hinge structure. The elastic cover is slidably disposed between the at least one hinge structure and the first housing and the second housing. The elastic cover has a plurality of first racks. The two bearing plates are respectively slidably disposed in the first housing and the second housing, and each of the bearing plates has a plurality of second racks. The plurality of second racks are respectively opposite to the plurality of first racks. The flexible screen is disposed on the two bearing plates. The plurality of first synchronous gears are pivoted to the first housing, and each of the first synchronous gears is engaged with each of the first racks and second racks. The plurality of second synchronous gears are pivoted to the second housing, and each of the second synchronous gears is engaged with each of the first racks and second racks. The first housing and the second housing are adapted to drive the at least one hinge structure to turn relative to the centerline, and at the same time, each of the first synchronous gears and each of the second synchronous gears are rotated relative to each of the first racks and each of the second racks to drive the two bearing plates to be relatively close to the centerline to switch to a tablet mode or relatively far away from the centerline to switch to a folded mode.

In an embodiment of the invention, when switched to the tablet mode, the first housing and the second housing are abutted against each other and form a flat plate structure. The plurality of first synchronous gears are rotated in a first rotation direction, and the plurality of second synchronous gears are rotated in a second rotation direction opposite to the first rotation direction to drive two ends of the elastic cover to be respectively accommodated in two grooves of the first housing and the second housing.

In an embodiment of the invention, the elastic cover is flattened on the first housing and the second housing. The plurality of first synchronous gears and the plurality of second synchronous gears drive the two bearing plates to approach each other and to be located above the at least one hinge structure, so that the flexible screen is flattened on the two bearing plates.

In an embodiment of the invention, when switching to the folded mode, the at least one hinge structure is bent relative to the centerline and the first housing and the second housing are parallel to each other. The plurality of first synchronous gears are rotated in a second rotation direction, and the plurality of second synchronous gears are rotated in a first rotation direction opposite to the second rotation direction to drive two ends of the elastic cover to be separated from two grooves of the first housing and the second housing respectively.

In an embodiment of the invention, the elastic cover is in a bent state and partially protruded to an outside of the first housing and the second housing, and the plurality of first synchronous gears and the plurality of second synchronous gears drive the two bearing plates to be moved away from each other and accommodate the at least one hinge structure, so that the flexible screen is in the bent state and partially suspended at the at least one hinge structure.

In an embodiment of the invention, the flexible screen has two side portions and a bent portion. The two side portions are respectively connected with the two bearing plates to form a single body, and the bent portion is located between the two side portions. In the tablet mode, the bent portion is in contact with the two bearing plates and covers the at least one hinge structure.

In an embodiment of the invention, the flexible screen has two side portions and a bent portion. The two side portions are respectively connected with the two bearing plates to form a single body, and the bent portion is located between the two side portions. In the folded mode, the bent portion is separated from the two bearing plates and suspended at the at least one hinge structure.

In an embodiment of the invention, the at least one hinge structure has an odd number of pivots disposed parallel to each other. Two bending components are disposed at a middle portion of the plurality of pivots and perpendicular to the plurality of pivots. Two gear sets are respectively sleeved on two ends of each of the pivots. Two connecting plates are respectively connected to the two bending components, wherein the two connecting plates are fixed to the first housing and the second housing. The first housing and the second housing are adapted to apply a force to the two connecting plates, thereby driving the two bending components, the two gear sets, and a portion of the pivots to be rotated synchronously relative to the centerline.

In an embodiment of the invention, the elastic cover has at least one pull handle connected to one of the pivots of the at least one hinge structure coincident with the centerline, so as to connect the elastic cover and the at least one hinge structure to form a single body.

In an embodiment of the invention, the folding-type electronic device further included a plurality of sliding grooves that are disposed on two opposite first inner wall surfaces of the first housing and the second housing perpendicular to the centerline, wherein each of the bearing plates is slidably disposed in the sliding grooves of the first housing and the second housing.

In an embodiment of the invention, in the folded mode, the two bearing plates are relatively far away along the plurality of sliding grooves respectively until the two bearing plates are abutted against two second inner wall surfaces of the first housing and the second housing parallel to the centerline.

In an embodiment of the invention, each of the bearing plates has at least one notch. In the tablet mode, each of the at least one notch is located on the at least one hinge structure, and in the folded mode, each of the at least one notch accommodates a portion of the at least one hinge structure.

In an embodiment of the invention, the first housing and second housing together form a bottom hole. In the tablet mode, the elastic cover is in a flat plate state and suspended at the bottom hole. In the folded mode, the elastic cover is in a bent state and penetrates the bottom hole.

Based on the above, the folding-type electronic device of the invention has two bearing plates that may be moved relative to each other and an elastically deformable elastic cover. The two bearing plates are used for carrying a flexible screen. When the folding-type electronic device is switched from the tablet mode to the folded mode, the elastic cover is bent and drives each of the first synchronous gears and each of the second synchronous gears to be rotated in opposite directions via a plurality of first racks, so as to drive the plurality of second racks and the two bearing plates to be moved relatively far away so as to adjust the position of the flexible screen in the first housing and the second housing, in order to reduce the amount of bending deformation of the flexible screen and avoid stress concentration phenomenon caused by the hinge structure squeezing the flexible screen, so as to improve the durability of the flexible screen.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
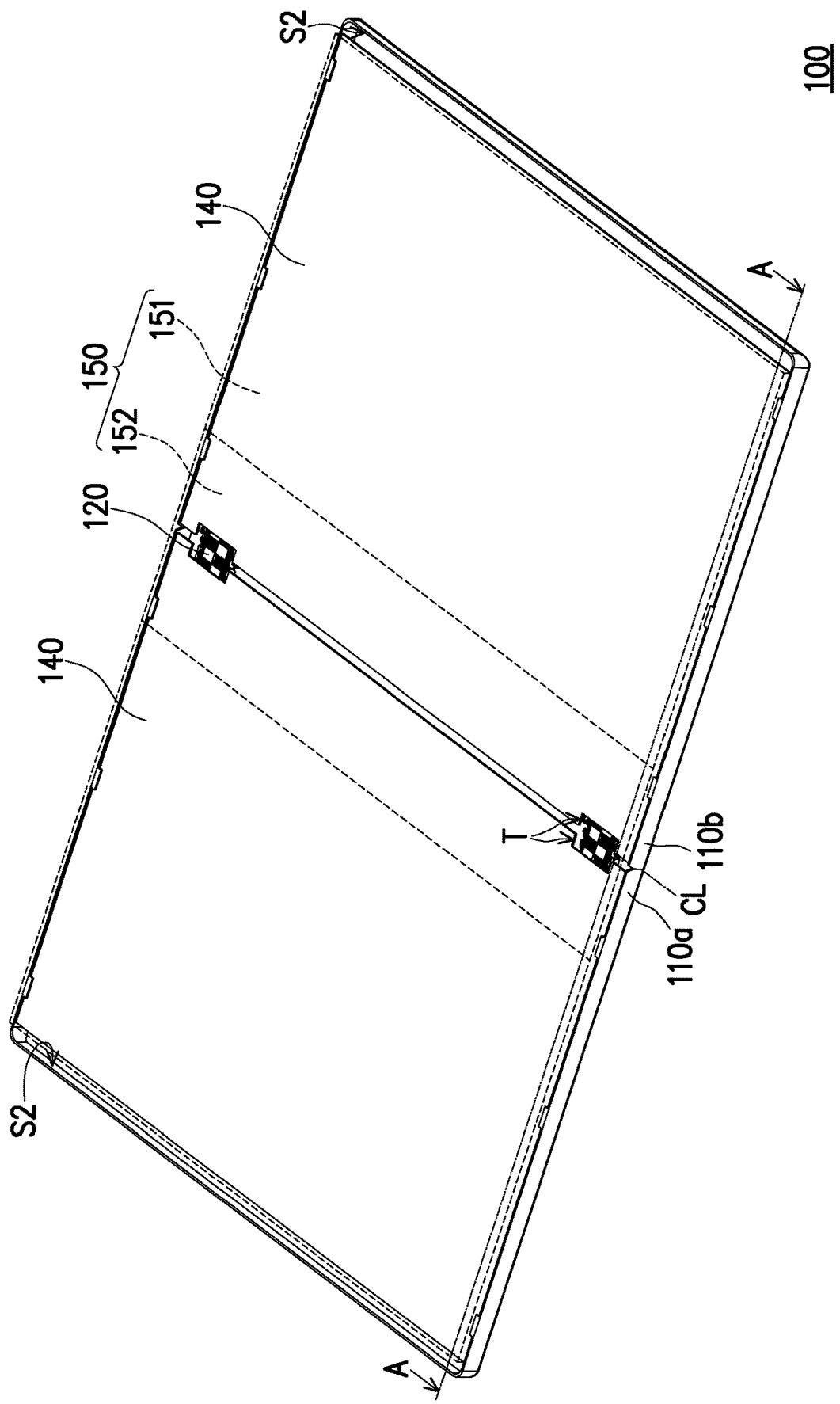
FIG. 1A is a three-dimensional view of a folding-type electronic device of an embodiment of the invention switching to tablet mode.
Figure 1B:
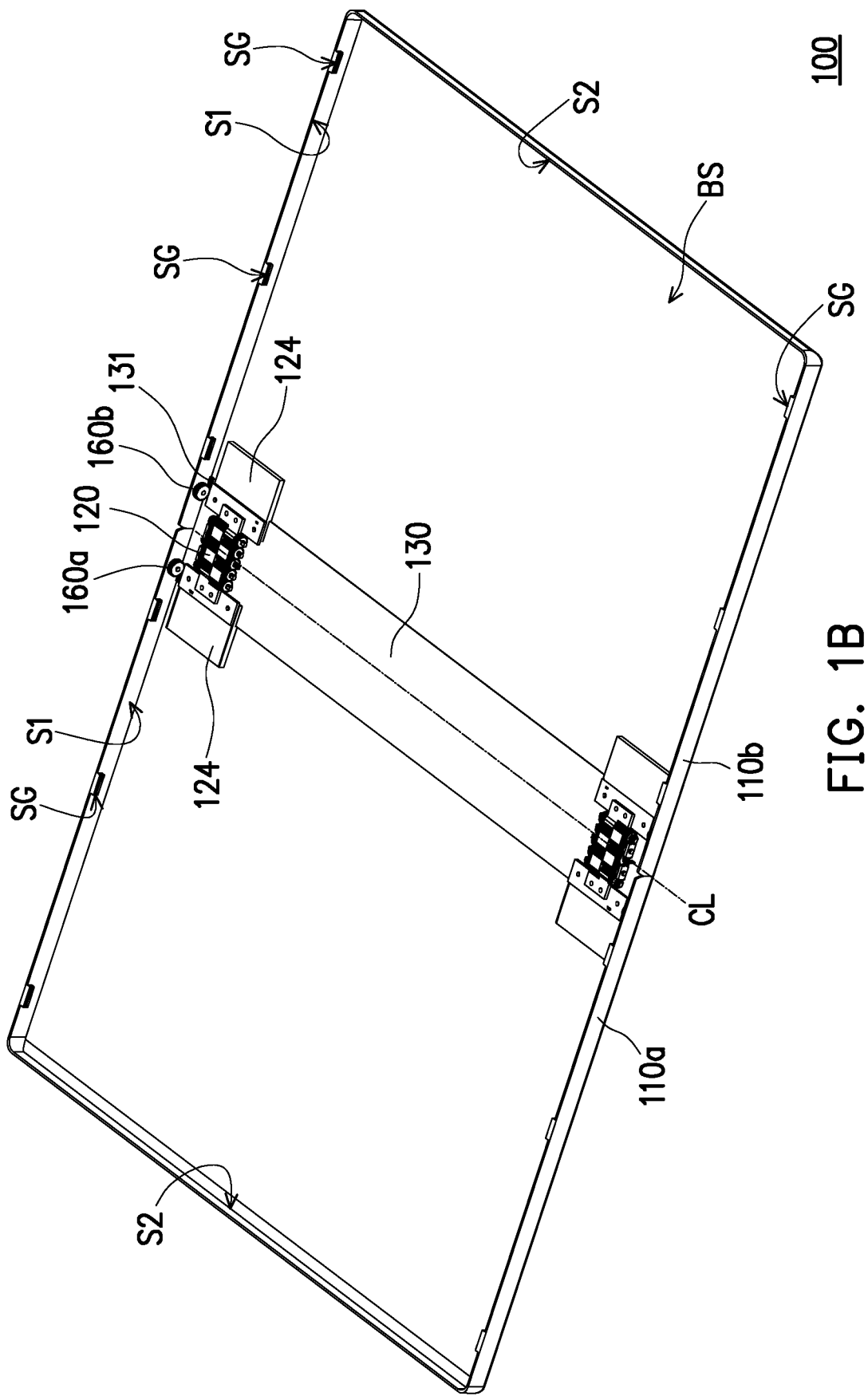
FIG. 1B is a three-dimensional view of some elements of the folding-type electronic device of FIG. 1A.
Figure 1C:
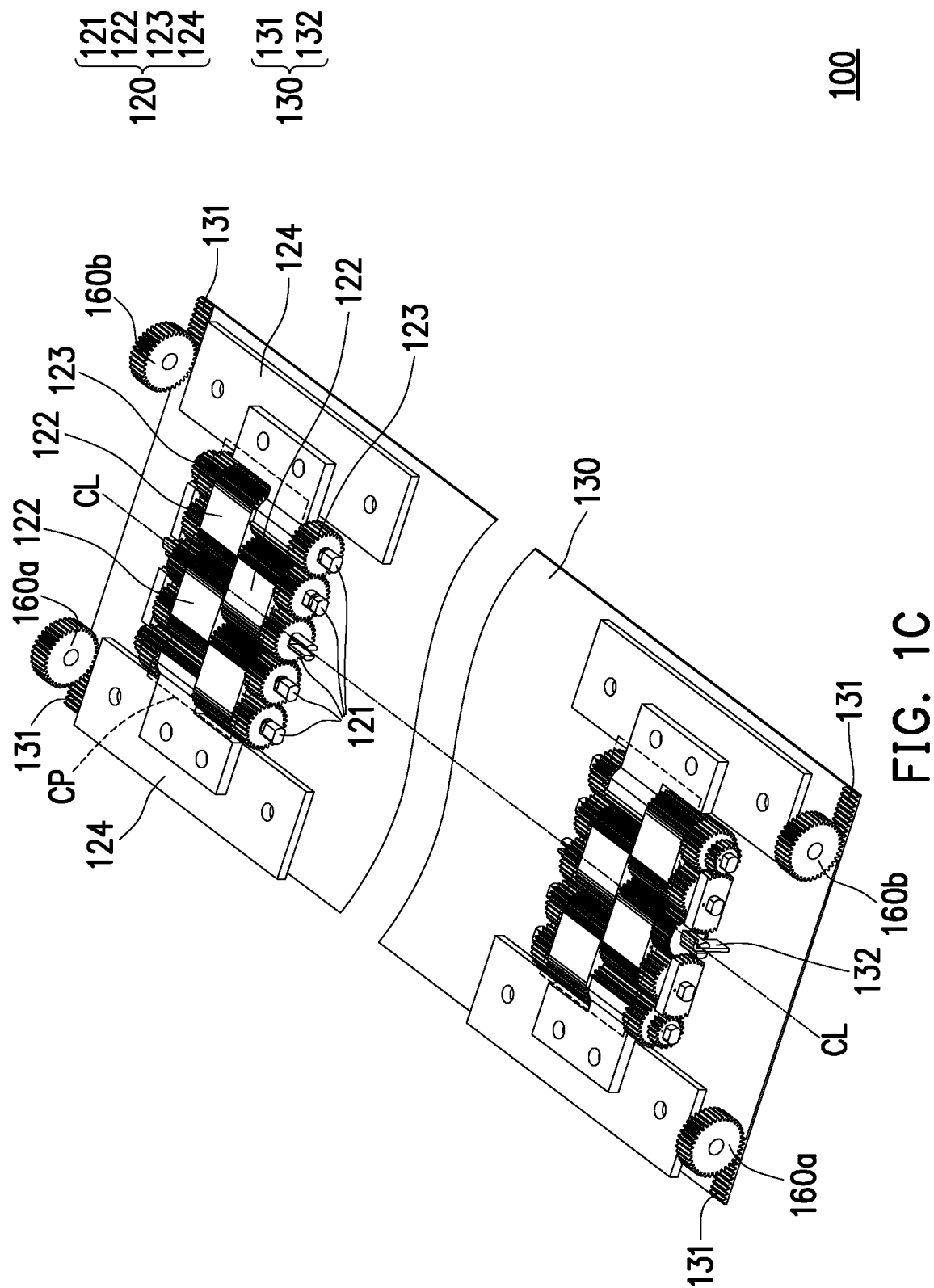
FIG. 1C is a three-dimensional view of a hinge structure and an elastic cover of the folding-type electronic device of FIG. 1A.

FIG. 1A is a three-dimensional view of a folding-type electronic device of an embodiment of the invention switching to tablet mode. FIG. 1B is a three-dimensional view of some elements of the folding-type electronic device of FIG. 1A. FIG. 1C is a three-dimensional view of a hinge structure and an elastic cover of the folding-type electronic device of FIG. 1A.

Figure 2A:
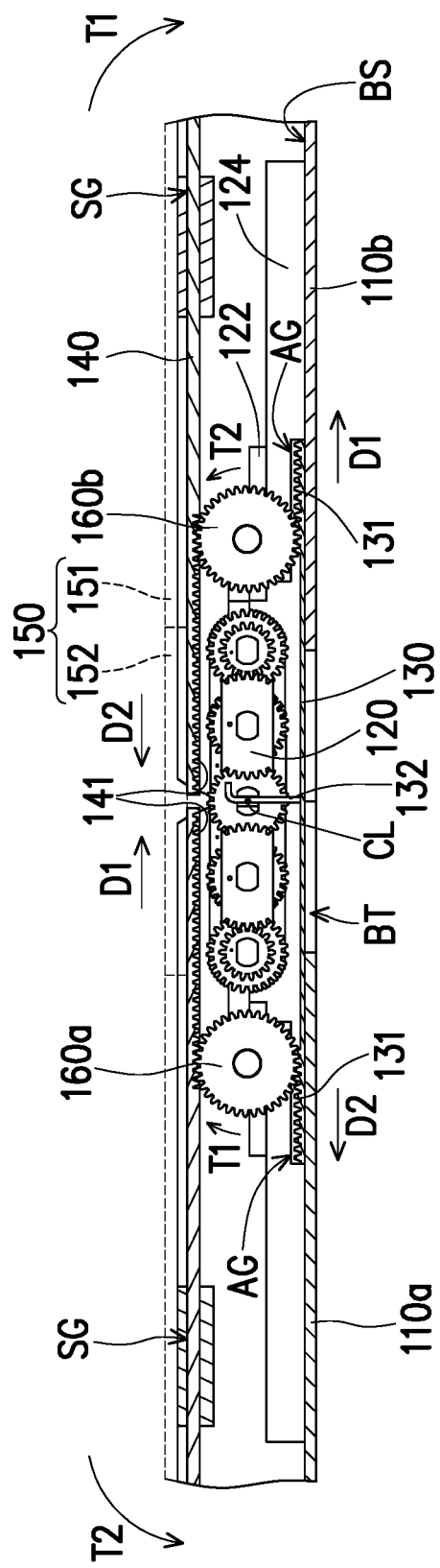
FIG. 2A is a cross-sectional view of the folding-type electronic device of FIG. 1A along line A-A.
Figure 2B:
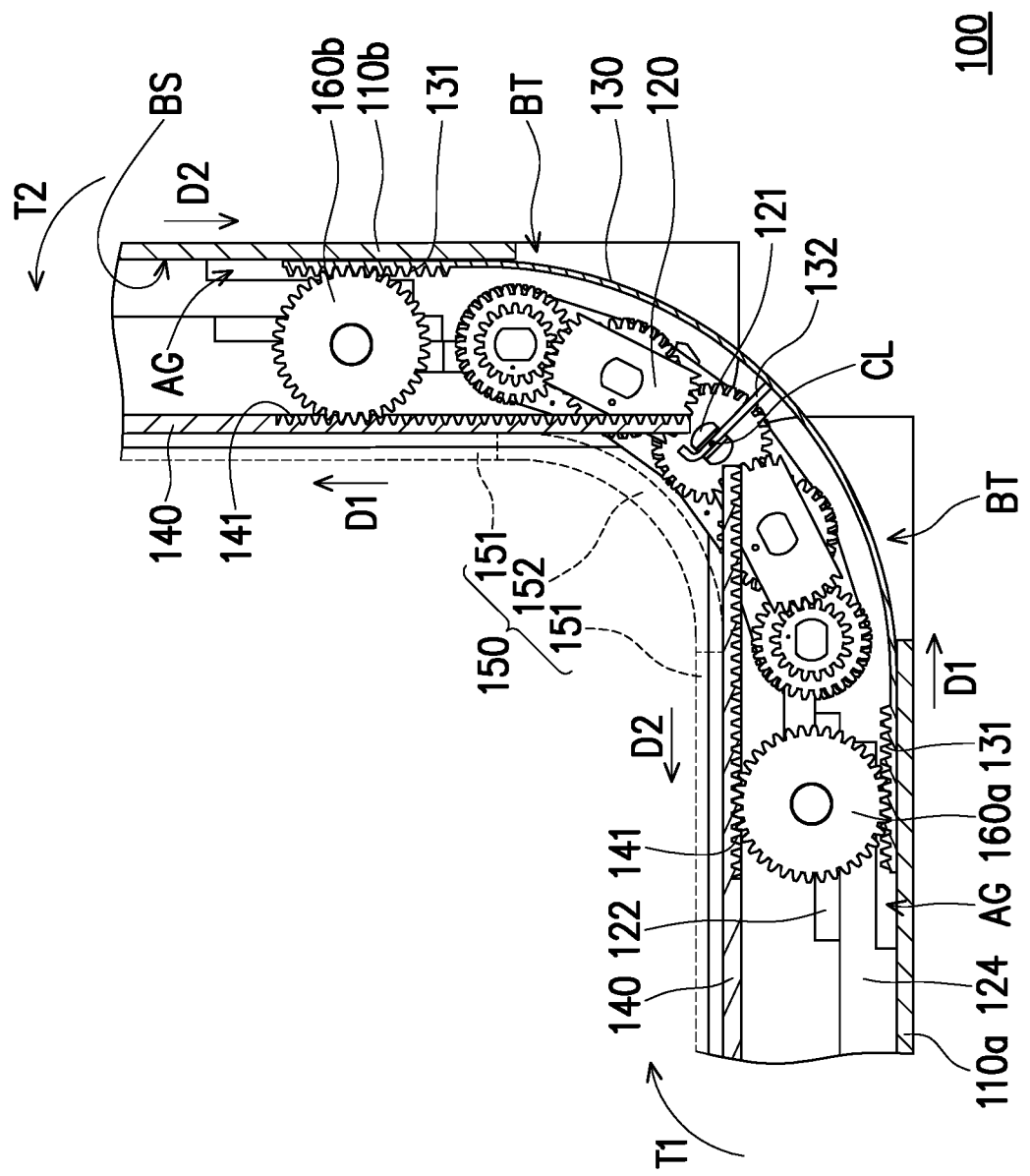
FIG. 2B is a cross-sectional view of the folding-type electronic device of FIG. 2A folded to an angle of 90 degrees.
Figure 2C:
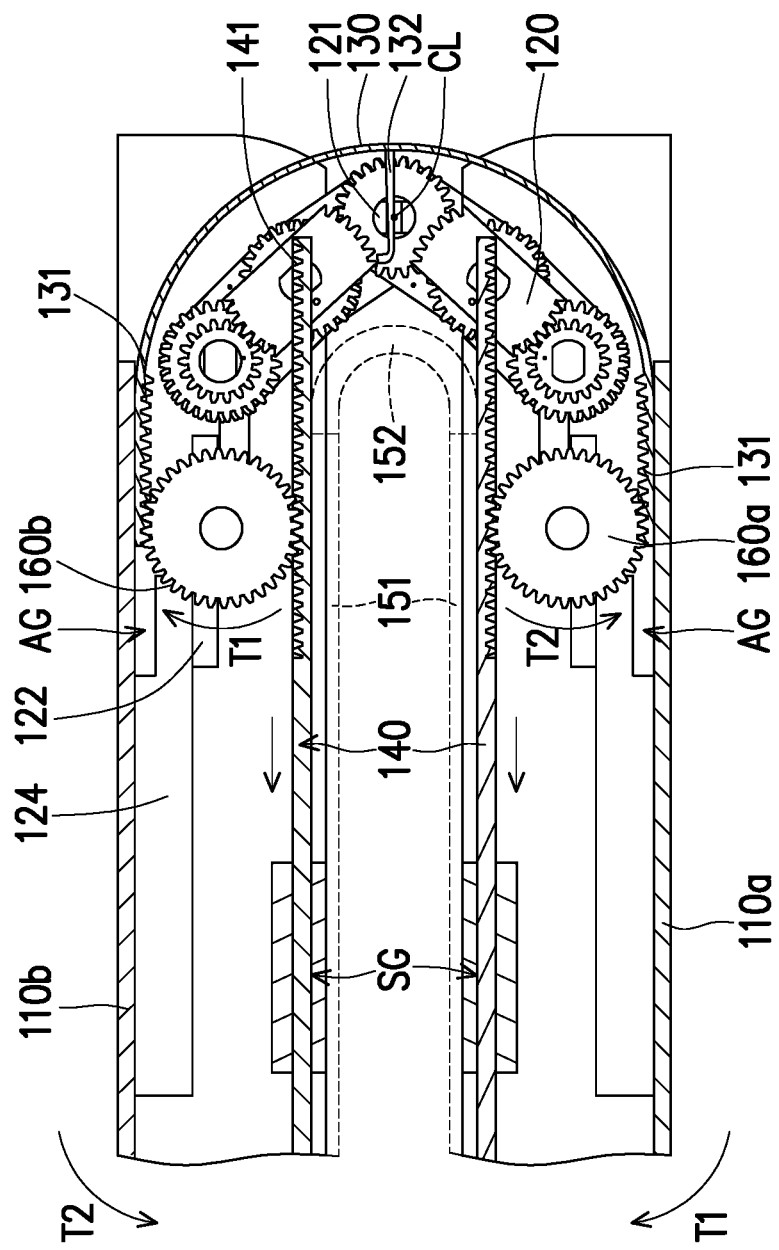
FIG. 2C is a cross-sectional view of the folding-type electronic device of FIG. 2A switched to folded mode.

FIG. 2A is a cross-sectional view of the folding-type electronic device of FIG. 1A along line A-A. FIG. 2B is a cross-sectional view of the folding-type electronic device of FIG. 2A folded to an angle of 90 degrees. FIG. 2C is a cross-sectional view of the folding-type electronic device of FIG. 2A switched to folded mode.

Referring to FIG. 1A and FIG. 2C, the folding-type electronic device of the invention is, for example, a tablet computer, a smart phone, or other electronic products that may be expanded and folded. In the present application, a tablet computer with a flexible screen is taken as an example. When a folding-type electronic device 100 is pushed by an external force and is relatively moved, the folding-type electronic device 100 may be switched to tablet mode or folded mode.

Referring to FIG. 1A to FIG. 1C, the folding-type electronic device 100 of the invention includes a first housing 110a, a second housing 110b, at least one hinge structure 120, an elastic cover 130, two bearing plates 140, a flexible screen 150, a plurality of first synchronous gears 160a, and a plurality of second synchronous gears 160b.

Please refer to FIG. 1C and FIG. 2A together, the first housing 110a and the second housing 110b are spaced apart from each other and symmetrical to a centerline CL. A plurality of sliding grooves SG are disposed on two opposite first inner wall surfaces S1 of the first housing 110a and the second housing 110b perpendicular to the centerline CL. In the present embodiment, the number of the at least one hinge structure 120 is two, and each of the hinge structures 120 is connected to the first housing 110a and the second housing 110b respectively, and the centerline CL passes through each of the hinge structures 120. In addition, the first housing 110a and the second housing 110b are adapted to drive the two hinge structures 120 to be rotated with the centerline CL as the rotation center.

Referring to FIG. 1A and FIG. 1B, the elastic cover 130 is slidably disposed between each of the hinge structures 120 and the first housing 110a and the second housing 110b. The elastic cover 130 is adapted to be slid relative to the first housing 110a and the second housing 110b and has a plurality of first racks 131, wherein the plurality of first racks 131 are respectively formed at four corners of the elastic cover 130 and face the two hinge structures 120. The two bearing plates 140 are slidably disposed in the first housing 110a and the second housing 110b, respectively. In detail, each of the bearing plates 140 is slidably disposed in the plurality of sliding grooves SG of the first housing 110a and the second housing 110b. In this way, the movement path of each of the bearing plates 140 in the first housing 110a and the second housing 110b is restricted by the plurality of sliding grooves SG to avoid the occurrence of shifting phenomenon. In addition, each of the bearing plates 140 has a plurality of second racks 141. The plurality of second racks 141 are respectively opposite to the plurality of first racks 131.

The flexible screen 150 is disposed on the two bearing plates 140, wherein the flexible screen 150 may be a display panel or a touch panel, for example, and has an image display function and a touch function.

The plurality of first synchronous gears 160a are pivoted to the first inner wall surfaces S1 of the first housing 110a perpendicular to the centerline CL, and each of the first synchronous gears 160a is engaged with each corresponding first rack 131 and second rack 132. The plurality of second synchronous gears 160b are pivoted to the first inner wall surfaces S1 of the second housing 110b perpendicular to the centerline CL, and each of the second synchronous gears 160b is engaged with each corresponding first rack 131 and second rack 132. Thereby, each of the first synchronous gears 160a and each of the second synchronous gears 160b may synchronously drive each corresponding bearing plate 140 and the elastic cover 130.

Referring to FIG. 2A to FIG. 2C, the first housing 110a and the second housing 110b are adapted to drive the two hinge structures 120 to turn relative to the centerline CL, at the same time, each of the first synchronous gears 160a and each of the second synchronous gears 160b are rotated relative to each of the first racks 131 and each of the second racks 141 to drive the two bearing plates 140 to be relatively close to the centerline CL to switch to tablet mode (see FIG. 2A). In tablet mode, the flexible screen 150 is used for large-scale display, or drives the two bearing plates 140 to be moved relatively far away from the centerline CL to switch to folded mode (FIG. 2C). In folded mode, the flexible screen 150 is automatically turned off to save power.

In other embodiments, the two bearing plates 140 may also be driven to be expanded 90 degrees relative to each other via external force (see FIG. 2B), and the first housing 110a, the second housing 110b, and the two bearing plates 140 are supported by the torque provided by the two hinge structures 120 to form a laptop mode. In folded mode, one portion of the flexible screen 150 displays a virtual keyboard, and another portion of the flexible screen 150 is used to display an image.

Referring to FIG. 2A and FIG. 2C, the first housing 110a and the second housing 110b together form a bottom through-hole BT. In tablet mode, the elastic cover 130 is in a flat plate state and suspended at the bottom through-hole BT, and in folded mode, the elastic cover 130 is in a bent state and penetrates the bottom through-hole BT. Furthermore, via the bottom through-hole BT, the elastic cover 130 is protruded outside the first housing 110a and the second housing 110b in folded mode. When the folding-type electronic device 100 falls, the elasticity of the elastic cover 130 may reduce the impact of external force.

Furthermore, referring to FIG. 1C and FIG. 2A to FIG. 2C, each of the hinge structures 120 has an odd number of pivots 121, two bending components 122, two gear sets 123, and two connecting plates 124.

An odd number of pivots 121 are disposed parallel to each other, and the centerline CL passes through one of the pivots 121 located at the center, and the pivot 121 coincident with the centerline CL is used as a reference member (that is, shifting does not occur). The two bending components 122 are disposed at a center portion CP of the plurality of pivots 121 and perpendicular to the pivots 121. The two gear sets 123 are respectively sleeved on two ends of each of the pivots 121. The two connecting plates 124 are respectively connected to the two bending components 122 and the two connecting plates 124 are fixed to a bottom surface BS of the first housing 110a and the second housing 110b. In particular, the first housing 110a and the second housing 110b are adapted to apply a force to the two connecting plates 124, thereby driving the two bending components 122, the two gear sets 123, and a portion of the pivots 121 to be rotated synchronously relative to the centerline CL.

The elastic cover 130 has two pull handles 132 respectively connected to two pivots 121 of the two hinge structures 120 coincident with the centerline CL to connect the elastic cover 130 and the two hinge structures 120 to form a single body. In addition, since the two pull handles 132 are formed at the center surface of the elastic cover 130 and are respectively connected to the two pivots 121 as reference members, the elastic cover 130 is restricted by the two pivots 121 to prevent the occurrence of shifting to the elastic cover 130 between the first housing 110a and the second housing 110b to ensure that the elastic cover 130 is only bent and deformed under the external force of the first housing 110a, the second housing 110b, the plurality of first synchronous gears 160a, and the plurality of second synchronous gears 160b.

Each of the bearing plates 140 has two notches T. In tablet mode (see FIG. 2A), each of the notches T is located on the corresponding hinge structure 120. In folded mode (see FIG. 2C), each of the notches T accommodates a portion of the corresponding hinge structure 120. Furthermore, via the plurality of notches T, the hinge structure 120 passes through each of the notches T in folded mode and is protruded outside each of the bearing plates 140, thereby avoiding structural interference between the bearing plate 140 and the hinge structure 120. In addition, the use of the notches T may reduce the size of the gap between the two bearing plates 140.

Referring to FIG. 1A and FIG. 2A, the flexible screen 150 has two side portions 151 and a bent portion 152. The two side portions 151 are respectively connected with the two bearing plates 140 to form a single body, and therefore the two bearing plates 140 are adapted to synchronously drive the two side portions 151 to flatten the flexible screen 150 or bend the flexible screen 150. The bent portion 152 is located between the two side portions 151 and is opposite to the centerline CL, and the bent portion 152 covers the gap between the two bearing plates 140.

Referring to FIG. 1A, FIG. 1C, and FIG. 2A, when the folding-type electronic device 100 is switched to tablet mode, the first housing 110a and the second housing 110b respectively drive the two hinge structures 120 to be rotated in a second rotation direction T2 and a first rotation direction T1, respectively, until the first housing 110a and the second housing 110b are abutted against each other and form a flat plate structure.

The plurality of first synchronous gears 160a are rotated in the first rotation direction T1, and the plurality of second synchronous gears 160b are rotated in the second rotation direction T2 opposite to the first rotation direction T1 to drive the plurality of first racks 131 located at two ends of the elastic cover 130 to respectively slide in a second direction D2 and a first direction D1 and be respectively accommodated in two grooves AG of the first housing 110a and the second housing 110b so that the elastic cover 130 is flattened on the bottom surface BS of the first housing 110a and the second housing 110b. At the same time, the plurality of first synchronous gears 160a and the plurality of second synchronous gears 160b drive the two bearing plates 140 to be slid in the first direction D1 and the second direction D2 respectively to approach each other. The two bearing plates 140 are connected in a straight line and located above the two hinge structures 120 so that the flexible screen 150 is flattened on the two bearing plates 140 and the bent portion 152 is in contact with the two bearing plates 140 and covers the two hinge structures 120.

Referring to FIG. 2A to FIG. 2C, when the folding-type electronic device 100 is switched to folded mode, the first housing 110a and the second housing 110b drive the two hinge structures 120 to be respectively rotated in the first rotation direction T1 and the second rotation direction T2 to be bent relative to the centerline CL, and the first housing 110a and the second housing 110b are parallel to each other.

The plurality of first synchronous gears 160a are rotated in the second rotation direction T2, and the plurality of second synchronous gears 160b are rotated in the first rotation direction T1 opposite to the second rotation direction T2 to drive the plurality of first racks 131 located at two ends of the elastic cover 130 to respectively slide in the second direction D2 and the first direction D1 and be respectively separated from the two grooves AG of the two housings 110 so that the elastic cover 130 is in a bent state and partially protruded outside the two housings 110. At the same time, the plurality of first synchronous gears 160a and the plurality of second synchronous gears 160b drive the two bearing plates 140 to be slid in the second direction D2 and the first direction D1 to be moved away from each other, and the plurality of notches T of the two bearing plates 140 are used to accommodate the two hinge structures 120. In detail, the two bearing plates 140 are respectively relatively far away along the plurality of corresponding sliding grooves SG of the two housings 110 until the two bearing plates 140 are abutted against two second inner wall surfaces S2 of the two housings 110 parallel to the centerline CL. The flexible screen 150 is in a bent state, and the bent portion 152 thereof is separated from the two bearing plates 140 and suspended at the two hinge structures 120.

In addition, during the bending process of the folding-type electronic device 100 of the invention, the flexible screen 150 is driven by the two bearing plates 140 to be relatively far away from the centerline CL to prevent the two hinge structures 120 from directly squeezing the bent portion 152 of the flexible screen 150.

Based on the above, the folding-type electronic device of the invention has two bearing plates that may be moved relative to each other and an elastically deformable elastic cover. The two bearing plates are used for carrying a flexible screen. When the folding-type electronic device is switched from the tablet mode to the folded mode, the elastic cover is bent and drives each of the first synchronous gears and each of the second synchronous gears to be rotated in opposite directions via a plurality of first racks, so as to drive the plurality of second racks and the two bearing plates to be moved relatively far away so as to adjust the position of the flexible screen in the first housing and the second housing, in order to reduce the amount of bending deformation of the flexible screen and avoid stress concentration phenomenon caused by the hinge structure squeezing the flexible screen, so as to improve the durability of the flexible screen.

What is claimed is:

1. A folding-type electronic device, comprising:
a first housing;
a second housing spaced from the first housing and symmetrical to a centerline;
at least one hinge structure respectively connected to the first housing and the second housing, wherein the centerline passes through the at least one hinge structure;
an elastic cover slidably disposed between the at least one hinge structure and the first housing and the second housing, wherein the elastic cover has a plurality of first racks;
two bearing plates respectively slidably disposed in the first housing and the second housing, wherein each of the bearing plates has a plurality of second racks, and the second racks are respectively opposite to the first racks;
a flexible screen disposed on the two bearing plates;
a plurality of first synchronous gears pivoted to the first housing, wherein each of the first synchronous gears is engaged with each of the first racks and the second racks; and
a plurality of second synchronous gears pivoted to the second housing, wherein each of the second synchronous gears is engaged with each of the first racks and the second racks,
wherein the first housing and the second housing are adapted to drive the at least one hinge structure to turn relative to the centerline, and at the same time, each of the first synchronous gears and each of the second synchronous gears are rotated relative to each of the first racks and each of the second racks to drive the two bearing plates to be relatively close to the centerline in order to switch to a tablet mode or relatively far away from the centerline to switch to a folded mode.

2. The folding-type electronic device of claim 1, wherein when switching to the tablet mode, the first housing and the second housing are abutted against each other and form a flat plate structure, the first synchronous gears are rotated in a first rotation direction, and the second synchronous gears are rotated in a second rotation direction opposite to the first rotation direction to drive two ends of the elastic cover to be respectively accommodated in two grooves of the first housing and the second housing.

3. The folding-type electronic device of claim 2, wherein the elastic cover is flattened on the first housing and the second housing, and the first synchronous gears and the second synchronous gears drive the two bearing plates to approach each other and to be located above the at least one hinge structure, so that the flexible screen is flattened on the two bearing plates.

4. The folding-type electronic device of claim 1, wherein when switching to the folded mode, the at least one hinge structure is bent relative to the centerline and the first housing and the second housing are parallel to each other, the first synchronous gears are rotated in a second rotation direction, and the second synchronous gears are rotated in a first rotation direction opposite to the second rotation direction to drive two ends of the elastic cover to be respectively separated from two grooves of the first housing and the second housing.

5. The folding-type electronic device of claim 4, wherein the elastic cover is in a bent state and partially protruded to an outside of the first housing and the second housing, and the first synchronous gears and the second synchronous gears drive the two bearing plates to be moved away from each other and accommodate the at least one hinge structure, so that the flexible screen is in the bent state and partially suspended at the at least one hinge structure.

6. The folding-type electronic device of claim 2, wherein the flexible screen has two side portions and a bent portion, the two side portions are respectively connected with the two bearing plates to form a single body, the bent portion is located between the two side portions, and in the tablet mode, the bent portion is in contact with the two bearing plates and covers the at least one hinge structure.

7. The folding-type electronic device of claim 4, wherein the flexible screen has two side portions and a bent portion, the two side portions are respectively connected with the two bearing plates to form a single body, the bent portion is located between the two side portions, and in the folded mode, the bent portion is separated from the two bearing plates and suspended at the at least one hinge structure.

8. The folding-type electronic device of claim 1, wherein the at least one hinge structure has:
   an odd number of pivots disposed parallel to each other;
   two bending components disposed at a middle portion of the pivots and perpendicular to the pivots;
   two gear sets respectively sleeved on two ends of each of the pivots; and
   two connecting plates respectively connected to the two bending components, wherein the two connecting plates are fixed to the first housing and the second housing,
   wherein the first housing and the second housing are adapted to apply a force to the two connecting plates, thereby driving the two bending components, the two gear sets, and a portion of the pivots to be rotated synchronously relative to the centerline.

9. The folding-type electronic device of claim 8, wherein the elastic cover has at least one pull handle connected to one of the pivots of the at least one hinge structure coincident with the centerline, so as to connect the elastic cover and the at least one hinge structure to form a single body.

10. The folding-type electronic device of claim 1, further comprising a plurality of sliding grooves disposed on two opposite first inner wall surfaces of the first housing and the second housing perpendicular to the centerline, wherein each of the bearing plates is slidably disposed in the sliding grooves of the first housing and the second housing.

11. The folding-type electronic device of claim 10, wherein in the folded mode, the two bearing plates are relatively far away along the sliding grooves respectively until the two bearing plates are abutted against two second inner wall surfaces of the first housing and the second housing parallel to the centerline.

12. The folding-type electronic device of claim 1, wherein each of the bearing plates has at least one notch, in the tablet mode, each of the at least one notch is located on the at least one hinge structure, and in the folded mode, each of the at least one notch accommodates a portion of the at least one hinge structure.

13. The folding-type electronic device of claim 1, wherein the first housing and second housing together form a bottom hole, in the tablet mode, the elastic cover is in a flat plate state and suspended at the bottom hole, and in the folded mode, the elastic cover is in a bent state and penetrates the bottom hole.

* * * * *